(12) United States Patent
Suzumori et al.

(10) Patent No.: US 12,249,700 B2
(45) Date of Patent: Mar. 11, 2025

(54) BATTERY COOLER

(71) Applicants: TOYODA IRON WORKS CO., LTD., Toyota (JP); TOYOTA JIDOSHA KABUSHIKI KAISHA, Toyota (JP)

(72) Inventors: Michio Suzumori, Toyota (JP); Satoko Tofukuji, Toyota (JP); Yusuke Suzuki, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 514 days.

(21) Appl. No.: 17/764,965

(22) PCT Filed: Sep. 30, 2020

(86) PCT No.: PCT/JP2020/037148
§ 371 (c)(1),
(2) Date: Mar. 29, 2022

(87) PCT Pub. No.: WO2021/066010
PCT Pub. Date: Apr. 8, 2021

(65) Prior Publication Data
US 2022/0407147 A1    Dec. 22, 2022

(30) Foreign Application Priority Data

Sep. 30, 2019 (JP) .................... 2019-179194

(51) Int. Cl.
*H01M 10/6568* (2014.01)
*B60L 50/64* (2019.01)
(Continued)

(52) U.S. Cl.
CPC ......... *H01M 10/6568* (2015.04); *B60L 50/64* (2019.02); *H01M 10/613* (2015.04);
(Continued)

(58) Field of Classification Search
CPC ............... H01M 10/6568; H01M 10/6557
See application file for complete search history.

(56) References Cited

U.S. PATENT DOCUMENTS 7,682,732 B2  3/2010  Kim et al.
9,627,724 B2  4/2017  Yum et al.
(Continued)

FOREIGN PATENT DOCUMENTS

CN   106972220 B    7/2017
JP   2005-121319 A  5/2005
(Continued)

OTHER PUBLICATIONS

English translation of the Written Opinion of the International Searching Authority, dated Apr. 22, 2022.
Extended European Search Report dated Sep. 25, 2023.

*Primary Examiner* — Gregg Cantelmo

(57) ABSTRACT

A battery cooler comprises a refrigerant filling chamber, a refrigerant inflow passage, and a refrigerant outflow passage. The refrigerant filling chamber is sandwiched between opposed battery unit cells and is arranged at a position for receiving heat of the unit cells. The refrigerant inflow passage is connected to a lower portion of the refrigerant filling chamber. The refrigerant outflow passage is connected to an upper portion of the refrigerant filling chamber. The refrigerant filling chamber has at least one joint part joining partially and mutually opposed wall surfaces so as to suppress expansion and deformation of these surfaces caused by the pressure of the refrigerant. An outflow side wall surface rises from a bottom surface of the refrigerant filling chamber toward a connection part of the refrigerant outflow passage. The outflow side wall surface is provided with an inclined surface directed downward from a horizontal direction.

17 Claims, 8 Drawing Sheets

(51) Int. Cl.
  *H01M 10/613*  (2014.01)
  *H01M 10/625*  (2014.01)
  *H01M 10/6557* (2014.01)
  *H01M 50/204*  (2021.01)

(52) U.S. Cl.
  CPC ..... *H01M 10/625* (2015.04); *H01M 10/6557* (2015.04); *H01M 50/204* (2021.01); *H01M 2220/20* (2013.01)

(56) References Cited

U.S. PATENT DOCUMENTS

| | | |
|---|---|---|
| 10,403,941 B2 | 9/2019 | Arai et al. |
| 10,996,002 B2 | 5/2021 | Omi et al. |
| 2015/0357617 A1* | 12/2015 | Okada ................. H01M 10/647 429/120 |
| 2019/0363411 A1 | 11/2019 | Takeuchi et al. |
| 2021/0384570 A1* | 12/2021 | Tofukuji ............. H01M 10/647 |

FOREIGN PATENT DOCUMENTS

| | | |
|---|---|---|
| JP | 2013-157111 A | 8/2013 |
| JP | 2014-029232 A | 2/2014 |
| JP | 2015041418 A | 3/2015 |
| JP | 2017-196966 A | 11/2017 |
| JP | 2018-041772 A | 3/2018 |
| WO | 2018070115 A1 | 4/2018 |

\* cited by examiner

BATTERY COOLER

CROSS-REFERENCE TO RELATED APPLICATIONS

The present application is a U.S. National Phase entry of, and claims priority to, PCT Application No. PCT/JP2020/037148, filed Sep. 30, 2020, which claims priority to Japanese Patent Application No. 2019-179194, filed Sep. 30, 2019, all of which are incorporated herein by reference in their entireties for all purposes.

BACKGROUND

The present disclosure relates to a battery cooler for batteries used for electric vehicle or the like.

For example, as disclosed in Japanese Unexamined Patent Application Publication No. 2013-157111, an assembled battery comprising a plurality of unit cells can be cooled by sandwiching a heat pipe between battery unit cells.

In addition, it is also possible to use a battery cooler that circulates refrigerant, where the refrigerant can be vaporized by receiving heat of the battery and the vaporized refrigerant can be condensed in a condenser.

In the case of the latter battery cooler, when a battery is used in an inclined or vibrating environment, there is a possibility that unvaporized refrigerant leaks into a refrigerant outflow passage. The refrigerant outflow passage is where vaporized refrigerant proceeds toward the condenser. When unvaporized refrigerant leaks into the refrigerant outflow passage, the cooling efficiency of the refrigerant may be reduced. Thus, it is desired to suppress such leakage.

BRIEF SUMMARY

One aspect of the present disclosure is a battery cooler comprising a refrigerant filling chamber, a refrigerant inflow passage, and a refrigerant outflow passage. The battery cooler is arranged to be sandwiched between side surfaces of a plurality of unit cells forming an assembled battery. Refrigerant is charged in the refrigerant filling chamber. The refrigerant filling chamber is sandwiched between opposed unit cells and arranged at a position where the refrigerant filling chamber receives heat from the unit cells. The refrigerant inflow passage allows a refrigerant condensed by an external condenser to flow into the refrigerant filling chamber. The refrigerant inflow passage is connected to a lower portion of the refrigerant filling chamber. The refrigerant outflow passage allows refrigerant vaporized in the refrigerant filling chamber due to the heat of the unit cells to flow out and toward the condenser. The refrigerant outflow passage is connected to an upper portion of the refrigerant filling chamber. The refrigerant filling chamber has opposed wall surfaces in contact with the side surfaces of the unit cells arranged at its both sides. The refrigerant filling chamber also has at least one joint part joining partially and mutually the opposed wall surfaces, so as to suppress its own expansion and deformation caused by the pressure of the refrigerant. An outflow side wall surface rises from a bottom surface of the refrigerant filling chamber toward a connection part of the refrigerant outflow passage with respect to the refrigerant filling chamber. The outflow side wall surface is provided with an inclined surface directed downward from a horizontal direction.

In some embodiments, the at least one joint part is part of a plurality of joint parts. The plurality of joint parts is arranged in a staggered manner along the wall surfaces of the refrigerant filling chamber on which the unit cells abut.

In some embodiments, the joint parts of the plurality of joint parts adjacent the outflow side wall surface are arranged in a staggered manner such that the lower joint parts of the plurality of joint parts are horizontally displaced with respect to upper joint parts of the plurality of joint parts.

In some embodiments, the connection part is located lateral to the upper joint parts of the plurality of joint parts in the horizontal directions, and the inclined surface is provided at a position adjacent to the connection part.

In some embodiments, the at least one joint part is arranged within a belt-like area extending parallel to the bottom surface of the refrigerant filling chamber by a predetermined width, the refrigerant inflow passage and the refrigerant outflow passage being located at upper and lower outer sides of the belt-like area.

In some embodiments, the refrigerant inflow passage and the refrigerant outflow passage are located at opposite ends in the refrigerant filling chamber and protrude in directions away from each other. Flat parts, on which wall bodies forming a housing for holding each unit cell are abutted, are integrally provided above the refrigerant inflow passage and under the refrigerant outflow passage. The outflow side wall surface is formed within a horizontal width capable of securing planar areas for the flat parts on which the wall bodies abut and capable of securing a cooling area for the refrigerant filling chamber, on which the unit cells are arranged adjacent to the wall bodies abut.

DETAILED DESCRIPTION

[Construction of Assembled Battery]

Figure 1:
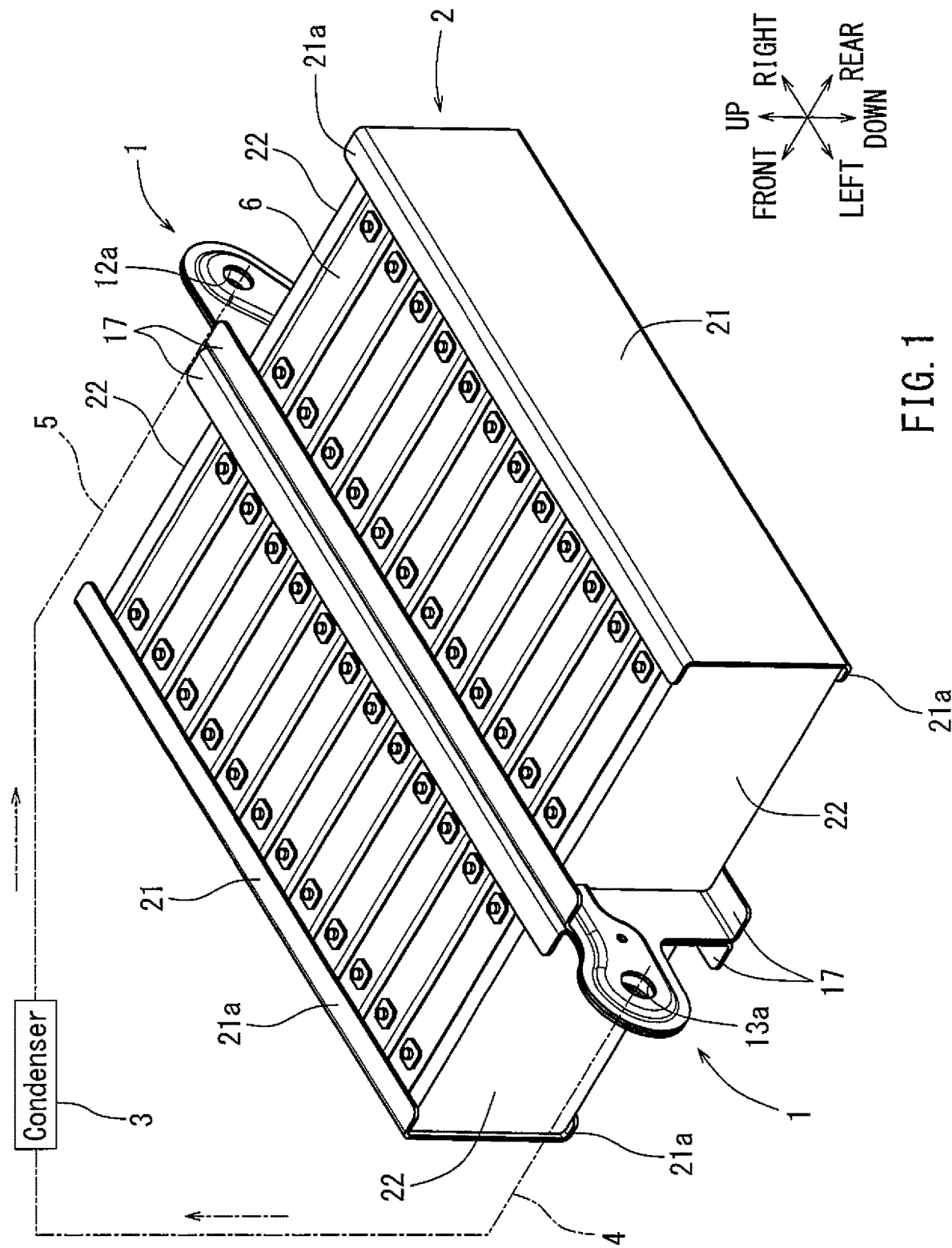
FIG. 1 is a perspective view showing an assembled battery comprising an embodiment of a battery cooler.

FIG. 1 shows an assembled battery comprising a battery cooler as one embodiment. This assembled battery may be used for an electric vehicle, such as an electric car. In the assembled battery, a plurality of unit cells 6 is surrounded by a housing 2 so as to be integrated in a state that the unit cells 6 are connected in series to each other. In FIG. 1, the directional arrow shows each direction when the assembled battery is mounted on an electric vehicle in a state that the vertical direction is the direction of gravity. In the following description, description related to direction is on the basis of the direction indicated by the arrows. Such description is the same for the drawings other than FIG. 1.

In the example of FIG. 1, a plurality of unit cells 6 are arranged in two rows, one in the front and one in the rear. A battery cooler 1 formed in a plate shape is sandwiched between side surfaces of the two rows of unit cells 6, the side surfaces facing each other the in front and rear direction. Flange parts 17 extending toward the front and rear are formed at both upper and lower ends of the battery cooler 1. The unit cells 6 of each row are sandwiched and held by the upper and lower flange parts 17. Each unit cell 6 is covered with a holding frame 21 on the opposite side of the battery cooler 1. Flange parts 21a are also formed at both upper and lower ends of the holding frame 21. The unit cells 6 of each row are sandwiched and held by the upper and lower flange parts 21a.

Figure 2:
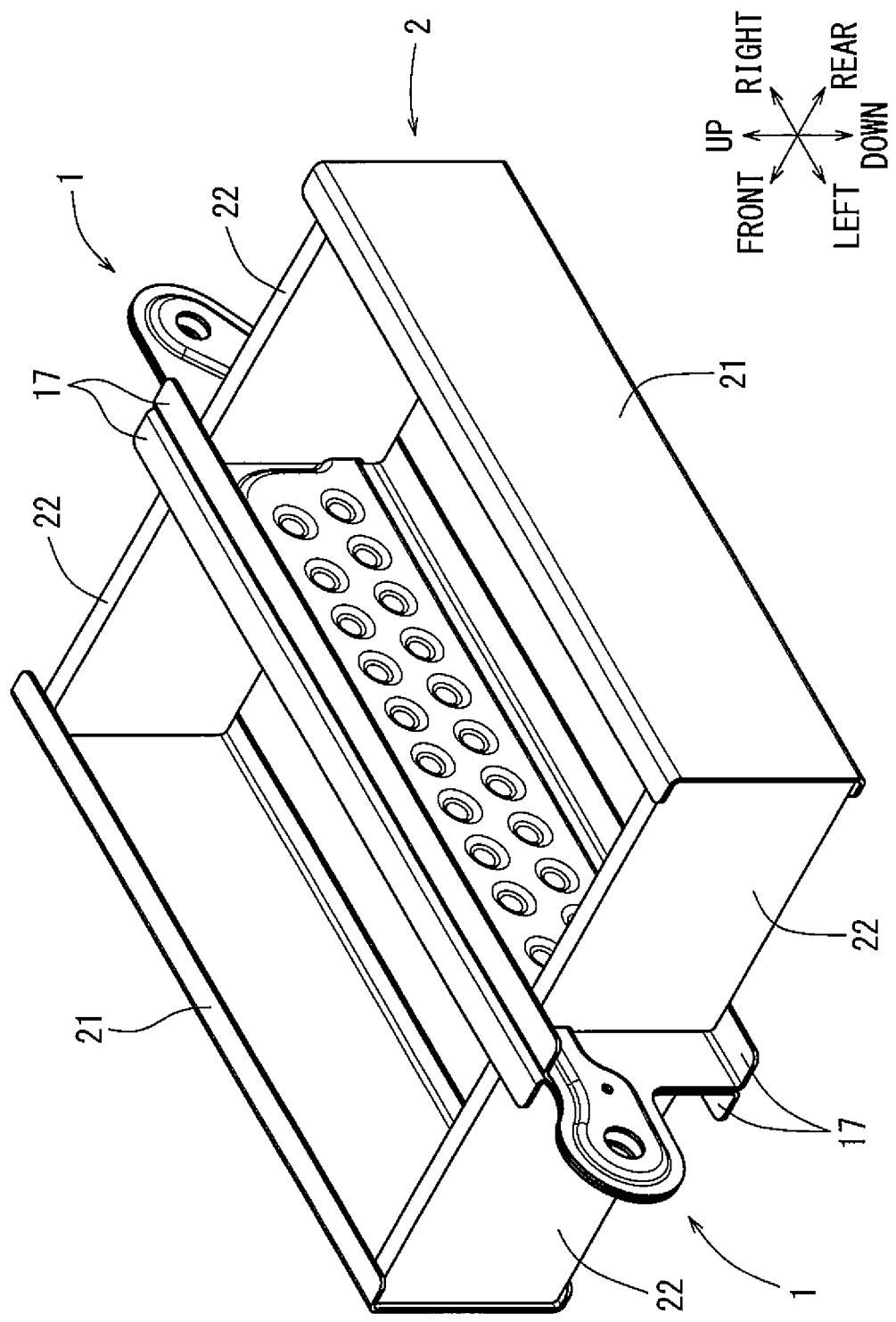
FIG. 2 is a perspective view showing the battery cooler and a housing of the assembled battery.
Figure 3:
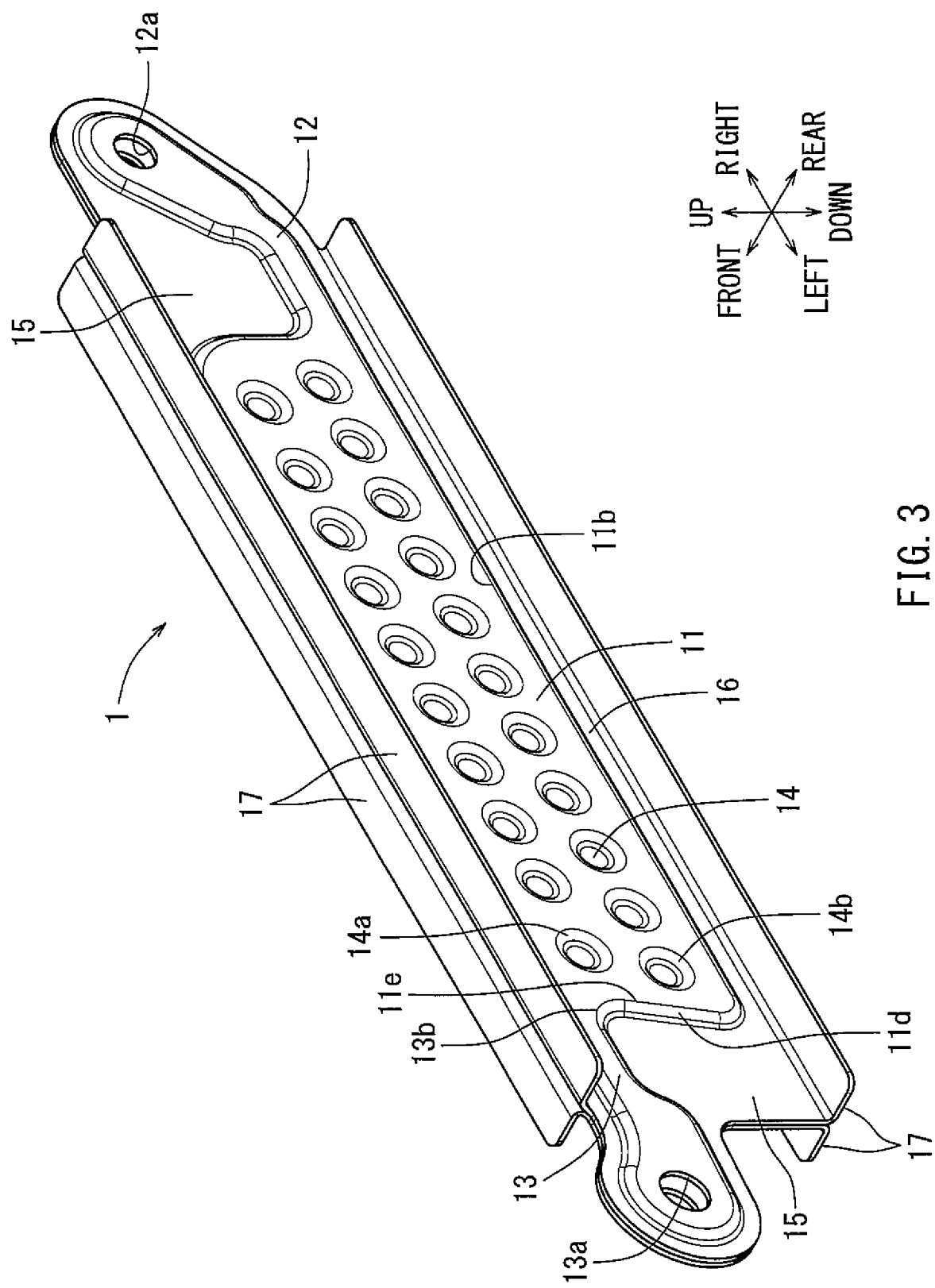
FIG. 3 is a perspective view of the battery cooler.

End plates 22 forming wall bodies of the housing 2 are respectively provided at both ends of the unit cells 6 of each row. These four end plates 22 are fixed to the battery cooler 1 and the holding frames 21 by welding. In this way, a set of an assembled battery is comprised of unit cells 6 arranged in two rows. When each unit cell 6 expands or shrinks due to its discharge and charge, each end plate 22 and each holding frame 21 are deformed to allow for the expansion or shrinkage of each unit cell 6. FIG. 2 shows a housing 2 where the unit cells 6 are removed from the housing 2 shown in FIG. 1.

[Battery Cooler]

Figure 6:
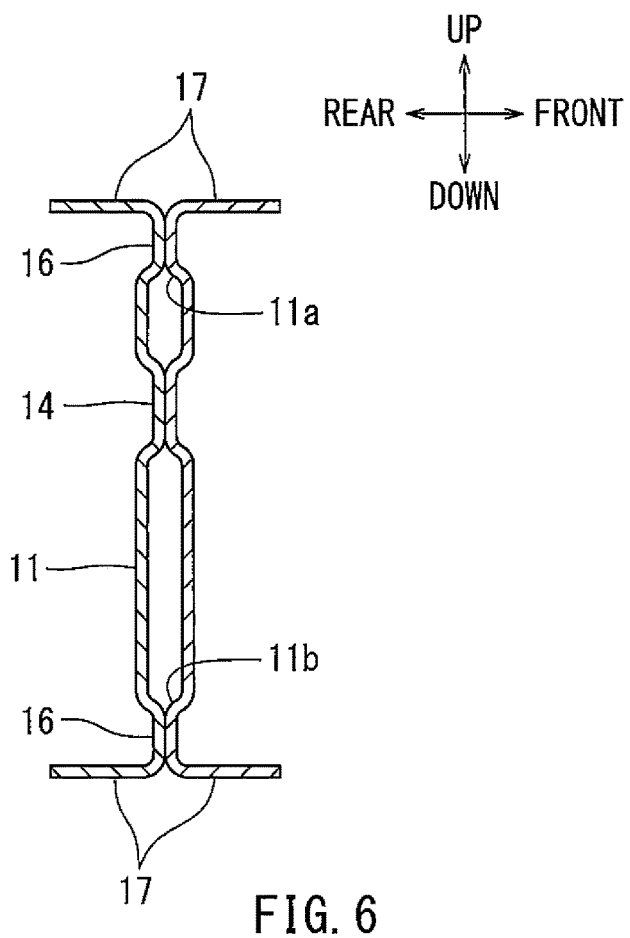
FIG. 6 is a cross-sectional view taken along line VI-VI in FIG. 4.

FIGS. 3-6 show the battery cooler 1 alone. In the battery cooler 1, as shown in FIG. 6, two steel plates having flange parts 17 at their upper and lower ends are joined by surface matching to form one sealed space. In the sealed space, a refrigerant filling chamber 11 is configured such that a refrigerant, such as hydrofluorocarbon (HFC) and/or hydrofluoroolefin (HFO), can be filled therein. The sealed space is formed by joining upper and lower joint parts 16 and right and left flat parts 15 by welding. Also, a plurality of circular or spot-like joint parts 14 may be formed within the area surrounded by the joint parts 16 and the flat parts 15. The joint parts 14 are formed by joining the two steel plates to each other by welding, similarly to the joining of the joint part 16 and the flat part 15. In this case, laser welding may be used. These joint parts 14 are arranged in a staggered manner on both front and rear surfaces of the refrigerant filling chamber 11. This suppresses expansion deformation of the refrigerant filling chamber 11 due to pressure changes of the refrigerant.

A refrigerant outflow passage 13 is formed at the upper left corner part of the refrigerant filling chamber 11. When the refrigerant is vaporized due to heat of the unit cells 6, the vaporized refrigerant can flows out through the refrigerant outflow passage 13. The refrigerant outflow passage 13 protrudes to the outside from the left end of the refrigerant filling chamber 11. A communication hole 13a is formed at a protruding end part of the refrigerant outflow passage 13. The communication hole 13a of the refrigerant outflow passage 13 is connected to a condenser 3 via a flow passage 4, as shown in FIG. 1. On the other hand, a refrigerant inflow passage 12 is formed at the right lower corner part of the refrigerant filling chamber 11. A refrigerant is condensed in the condenser 3, cooled, and circulated. The refrigerant then flows into the refrigerant filling chamber 11 through the refrigerant inflow passage 12. The refrigerant inflow passage 12 protrudes to the outside from the right end of the refrigerant filling chamber 11. A communication hole 12a is formed at a protruding end part of the refrigerant inflow passage 12. The communication hole 12a of the refrigerant inflow passage 12 is connected to the condenser 3 via a flow passage 5, as shown in FIG. 1.

With such a configuration, the refrigerant in the refrigerant filling chamber 11 vaporized due to the heat from each unit cell 6 flows out through the refrigerant outflow passage 13. Then, the vaporized refrigerant is sent to the condenser 3 through the flow passage 4, as shown by an arrow in FIG. 1. The vaporized refrigerant is condensed and cooled in the condenser 3, thereby becoming liquid again. The liquid refrigerant is circulated through the flow passage 5, shown in FIG. 1, flows into the refrigerant inflow passage 12, shown in FIG. 3, and to the refrigerant filling chamber 11, as indicated by arrows in FIG. 1. By repeating this action, each unit cell 6 in contact with the surface of the refrigerant filling chamber 11 is cooled. During this time, the refrigerant in the refrigerant filling chamber 11 in the liquid state is maintained at a liquid level 11k, which is shown by a dot-chain line in FIG. 4.

Figure 4:
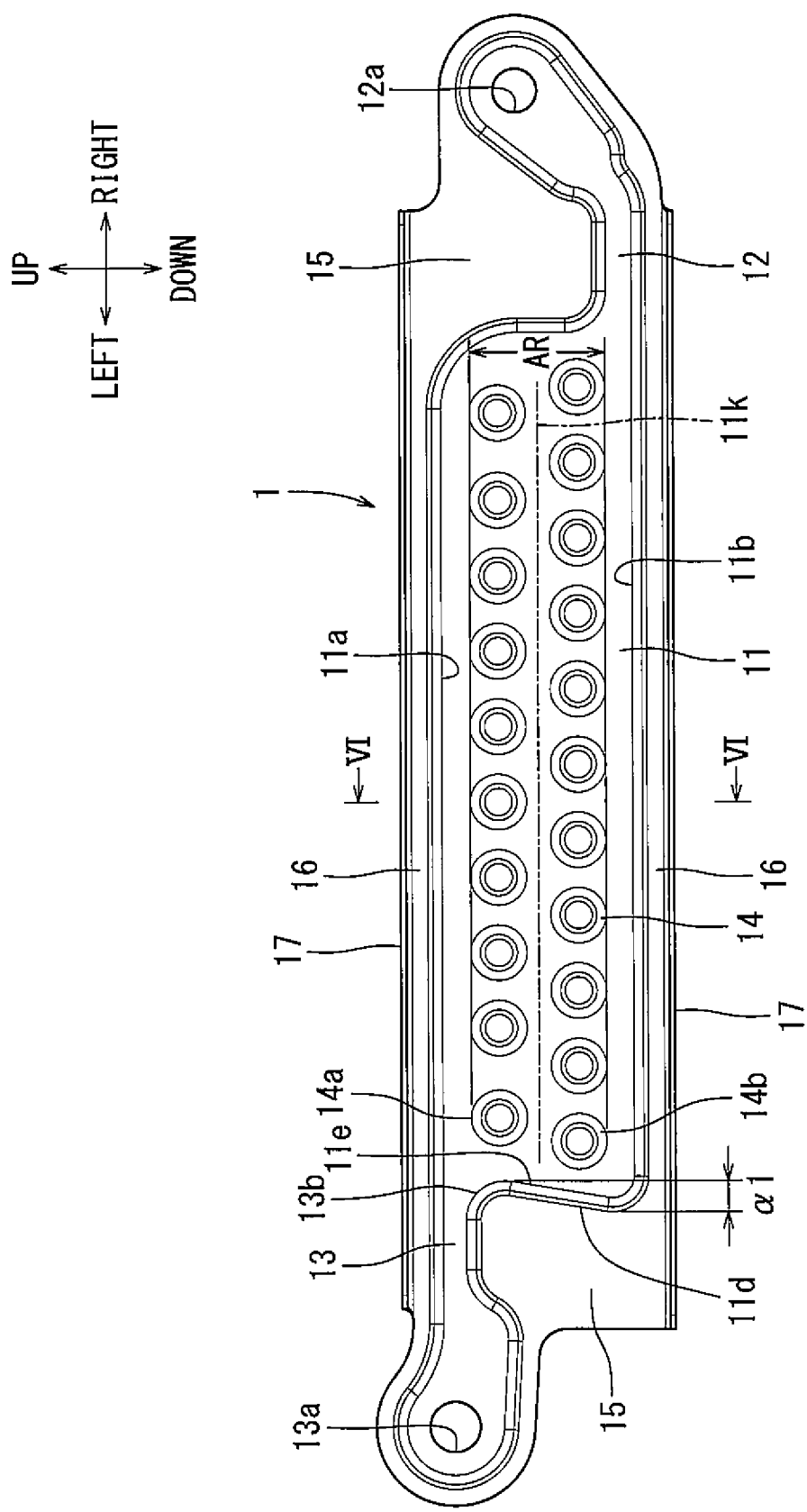
FIG. 4 is a front view of the battery cooler.
Figure 5:
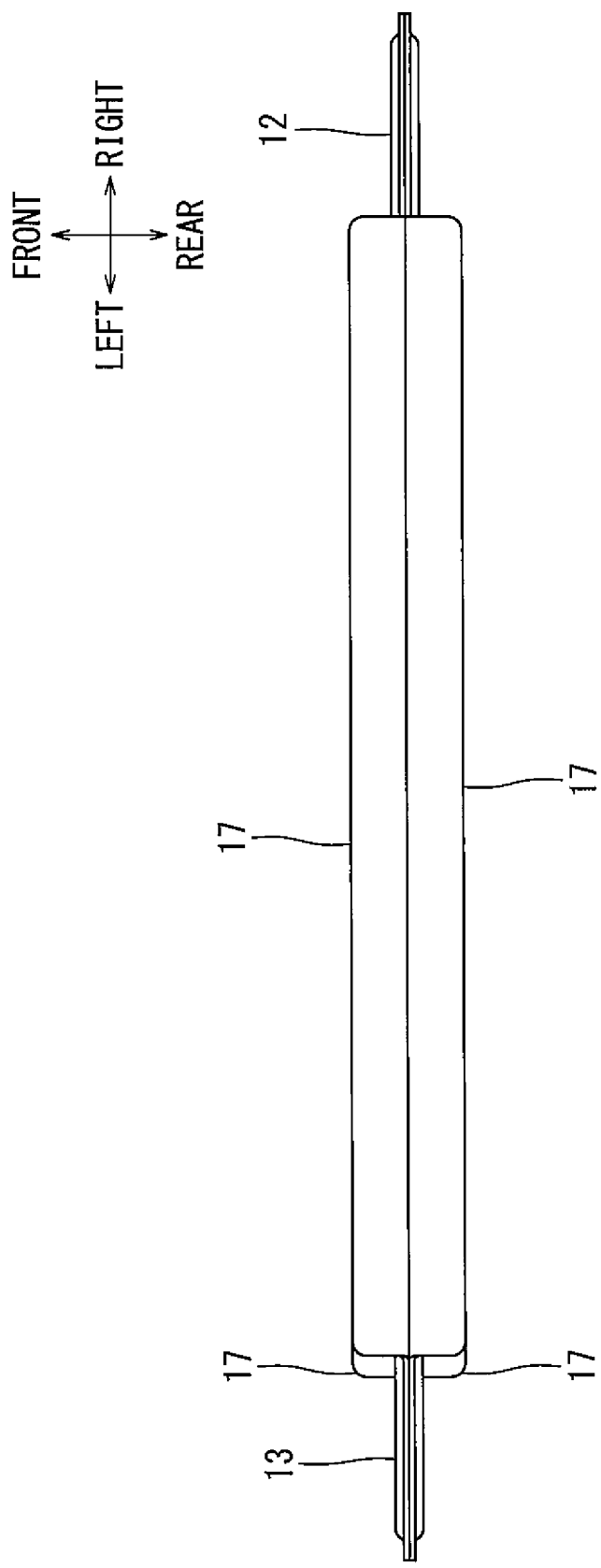
FIG. 5 is a plan view of the battery cooler.

As shown in FIG. 4, the joint parts 14 are arranged in a staggered manner and in an upper and lower row. The joint parts 14 are arranged so that intervals between the welded portions of the two steel plates, including the joint parts 16 and the flat parts 15, are substantially equal to each other. As a result, the stress due to the internal pressure of the refrigerant filling chamber 11 due to the refrigerant is not concentrated on a part of each welded portion. As a result, the plurality of joint parts 14 are arranged in an area AR extending in a belt-like shape along a bottom surface 11b of the refrigerant filling chamber 11 and having a constant width in a vertical direction. The refrigerant inflow passage 12 and the refrigerant outflow passage 13 are arranged on lower and upper sides, respectively, and in a positions that are outside of the area AR in the vertical direction. Thus, the refrigerant flows into the refrigerant filling chamber 11 through the refrigerant inflow passage 12 and then flows along the bottom surface 11b of the filling chamber 11. Thus, the joint parts 14 do not disturb the inflow of the refrigerant. On the other hand, the refrigerant flowing out from the refrigerant filling chamber 11 and toward the refrigerant outflow passage 13 flows along a top surface 11a. Thus, the joint parts 14 do not disturb the outflow of the refrigerant.

As shown in FIG. 4, the left side of the refrigerant filling chamber 11 is provided with an outflow side wall surface 11d. The outflow side wall surface 11d is formed to rise upward from the bottom surface 11b of the refrigerant filling chamber 11 toward a connection part 13b of the refrigerant outflow passage 13. The outflow side wall surface 11d is formed with an inclined surface 11e in which the inside surface in the refrigerant filling chamber 11 is inclined downward respective of the corresponding horizontal direction. The inclined surface 11e is formed along the entire outflow side wall surface 11d. That is, the inclined surface 11e is formed in the area of the outflow side wall surface 11d from a position adjacent to the bottom surface 11b to a position adjacent to the connection part 13b. Thus, even if the battery cooler 1 with the assembled battery is used in an inclined or vibrating environment, and the unvaporized refrigerant, which is usually at the liquid level 11k, flows toward the refrigerant outflow passage 13, the flow is bounced back by the inclined surface 11e. This can suppress leakage of the unvaporized refrigerant into the refrigerant outflow passage 13.

The inclined angle and length of the inclined surface 11e are set so that the inclined surface 11e is formed within horizontal width α1. The horizontal width α1 can secure a space sufficient for the end plate 22 to be welded to the flat part 15, and maintain a surface of the refrigerant filling chamber 11 where the unit cell 6 adjacent to the outflow side wall surface 11*d* can come into contact therewith.

The plurality of joint parts 14 arranged in a staggered manner in an upper and lower row are arranged so that joint parts 14*a*, 14*b* adjacent to the outflow side wall surface 11*d* are inclined and located so as to be aligned with the inclined surface 11*e*. In this way, the join parts 14 are arranged in a staggered manner. Arranging the joint parts 14 in a staggered manner can suppress flow of the unvaporized refrigerant as it moves toward the refrigerant outflow passage 13, as compared with a case where upper and lower joint parts 14 are vertically arranged. This is because the lower joint part 14*b* in proximity to the outflow side wall surface 11*d* resists the flow of unvaporized refrigerant toward the refrigerant outflow passage 13.

Figure 7:
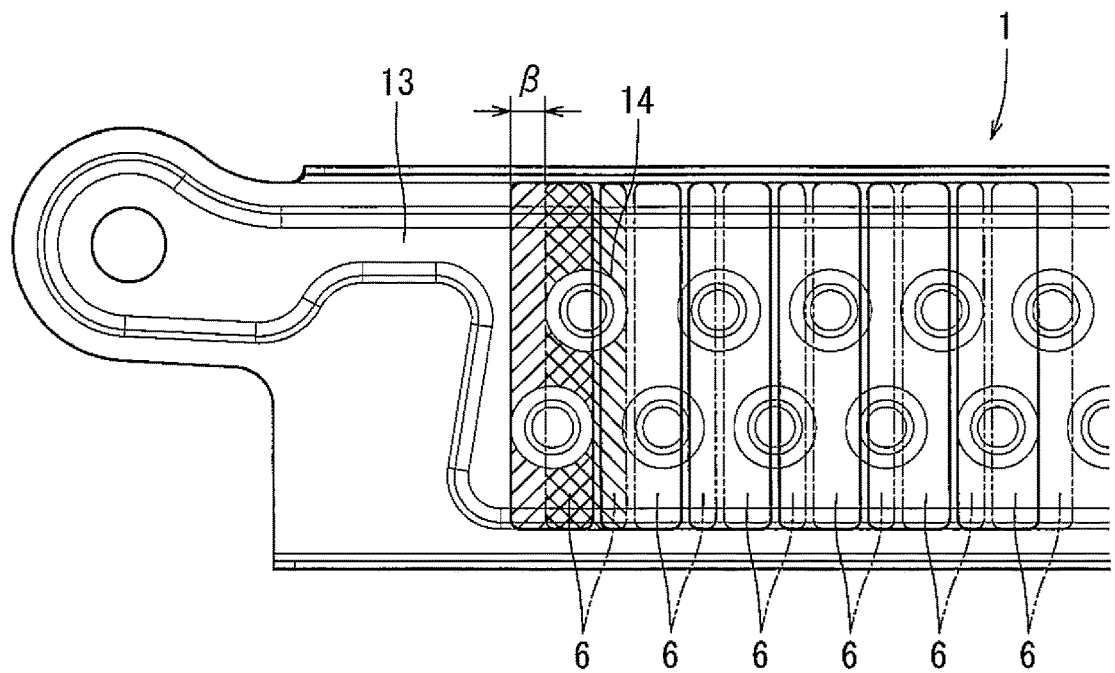
FIG. 7 is an explanatory diagram for illustrating a positional deviation of unit cells constituting the assembled battery with respect to a battery cooler.
Figure 8:
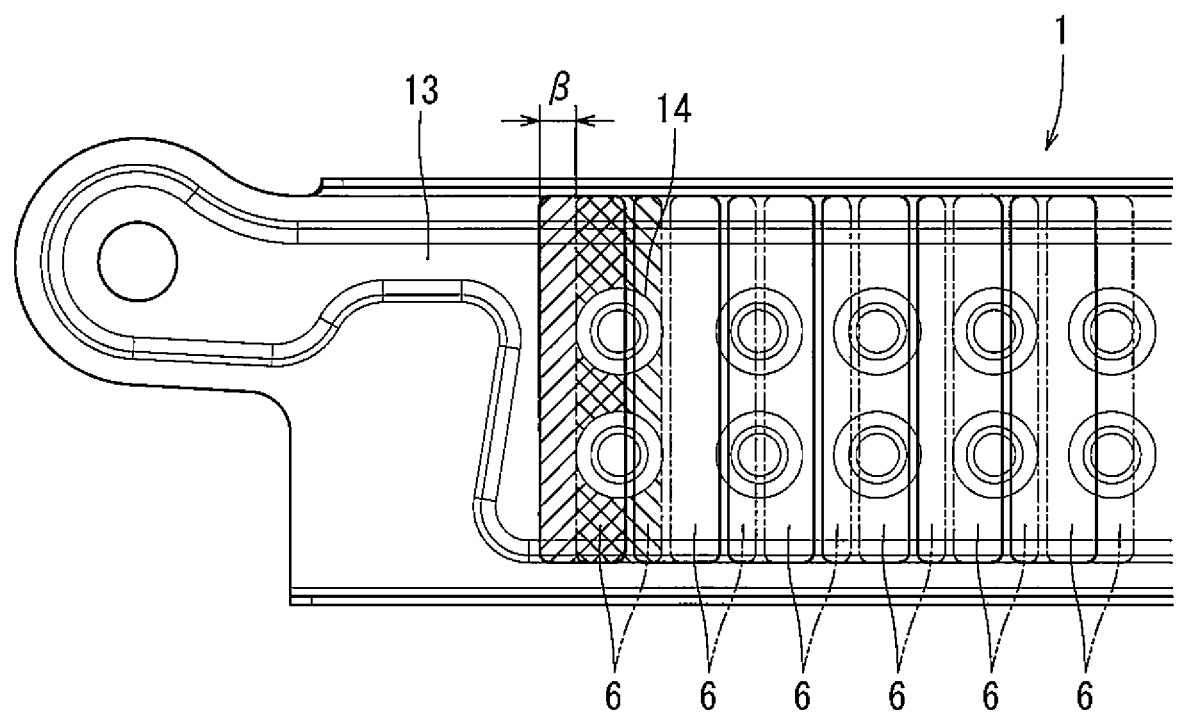
FIG. 8 is an explanatory diagram for illustrating a positional deviation of unit cells with respect to a battery cooler as a comparative example.

FIG. 7 shows positional deviation of the unit cells 6 with respect to the battery cooler 1. This may be due to differences in alignment during the assembly of the unit cells 6. On the other hand, FIG. 8 shows a comparative example of the battery cooler 1 of the above-described embodiment. In the comparative example, the upper and lower joint parts 14 are aligned with each other in the vertical direction. FIG. 8 also shows positional deviation of the unit cells 6 with respect to the comparative battery cooler 1 due to differences in the assembly of the unit cells 6. Both FIGS. 7 and 8 show a case where a positional deviation β is generated. In these cases, as shown in FIGS. 7 and 8, the variation amount of the cooling surface area of the battery cooler 1 in which each unit cell 6 comes into contact due to positional deviations is different depending on the difference in the arrangement of the joint parts 14. In FIGS. 7 and 8, the cooling surface of the battery cooler 1 is a surface of a raised region surrounded by the joint parts 16 and the flat parts 15 except for the recessed portions formed due to formation of the joint parts 14. In FIGS. 7 and 8, hatching is used to indicate the cooling surface of the battery cooler 1 in contact with the left most unit cell 6.

Figure 9:
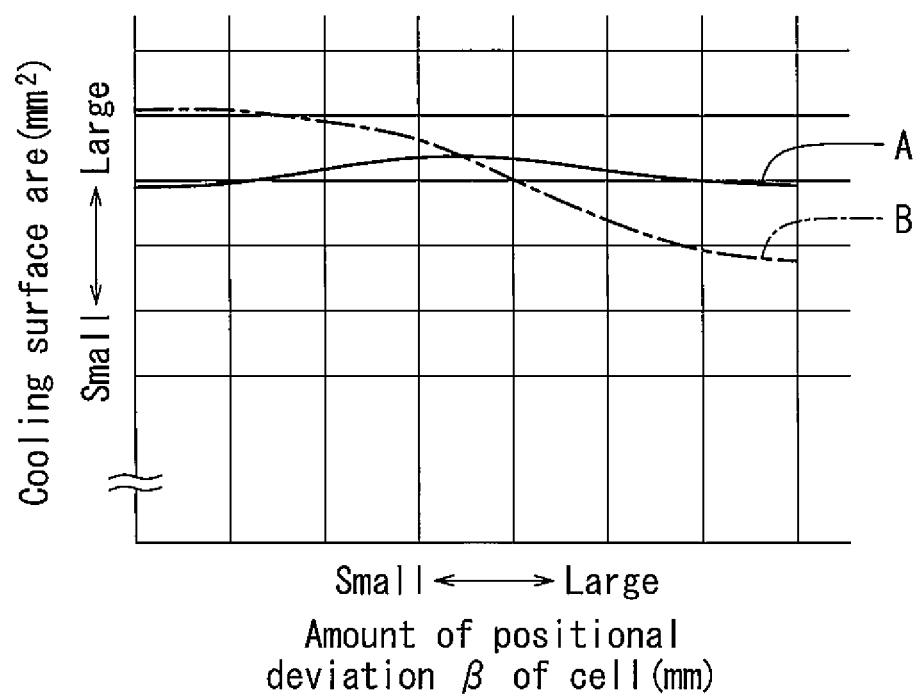
FIG. 9 is a graph showing a change in the area of a cooling surface of the battery cooler in contact with each unit cell due to the positional deviation of the unit cells.

FIG. 9 is a graph showing the variation of the cooling surface area of the left most unit cell 6. The solid line A in FIG. 9 shows the case of the staggered arrangement of the joint parts 14 in FIG. 7. The dot-chain line B shows a case of the aligned arrangement of the joint parts 14 of FIG. 8. As becomes clear from FIG. 9, in the case of the staggered arrangement (solid line A in FIG. 9) of FIG. 7, the variation of the cooling surface area of the battery cooler 1 with respect to the amount of the positional deviation is less than that of the case of the aligned arrangement (dot-chain line B in FIG. 9) of FIG. 8. That is, when the joint parts 14 are arranged in a staggered manner, variations, which are caused by the differences in position during the assembly of the unit cell 6, in the cooling performance of the battery cooler 1 can be suppressed.

[Modified Example of Outflow Side Wall Surface]

Figure 10:
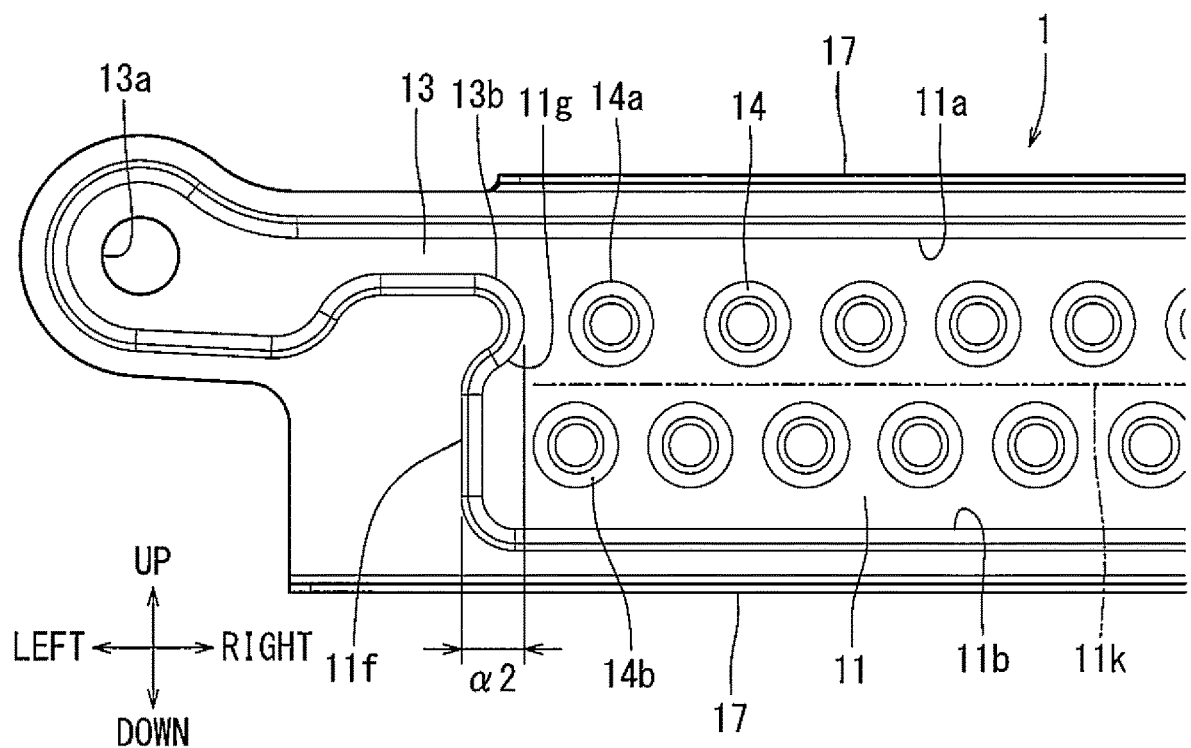
FIG. 10 is a partial front view of another embodiment of a battery cooler.

FIG. 10 shows another embodiment of a battery cooler 1. In this embodiment, an outflow side wall surface 11*f* having a shape different from that of the outflow side wall surface 11*d* of FIG. 4 is used. The outflow side wall surface 11*f* of this embodiment rises substantially vertically from the bottom surface 11*b* of the refrigerant filling chamber 11 toward the connection part 13*b* of the refrigerant outflow passage 13. The outflow side wall surface 11*f* then bends in a shape protruding to the right side at a lower part of the connection part 13*b*. This bent shape allows an inclined surface 11*g* to be formed at the lower part of the connection part 13*b* (or at a position adjacent to the connection part 13*b*). A lateral surface of the inclined surface 11*g* of the outflow side wall surface 11*f* located inside the refrigerant filling chamber 11 is inclined downward from a horizontal direction. In this way, the inclined surface 11*g* is formed at the outflow side wall surface 11*f*. Thus, even if unvaporized refrigerant, which is normally at the liquid level 11*k*, flows toward the refrigerant outflow passage 13, the flow is bounced back by the inclined surface 11*g*. This can suppress leakage of the unvaporized refrigerant into the refrigerant outflow passage 13. The outflow side wall surface 11*f*, which has the inclined surface 11*g*, is substantially located a predetermined width α2 away from the inlet of the refrigerant outflow passage 13. The width α2 can secure both a space for welding the end plate 22 and a cooling surface for the end most unit cell 6, as in the case of FIG. 4.

Figure 11:
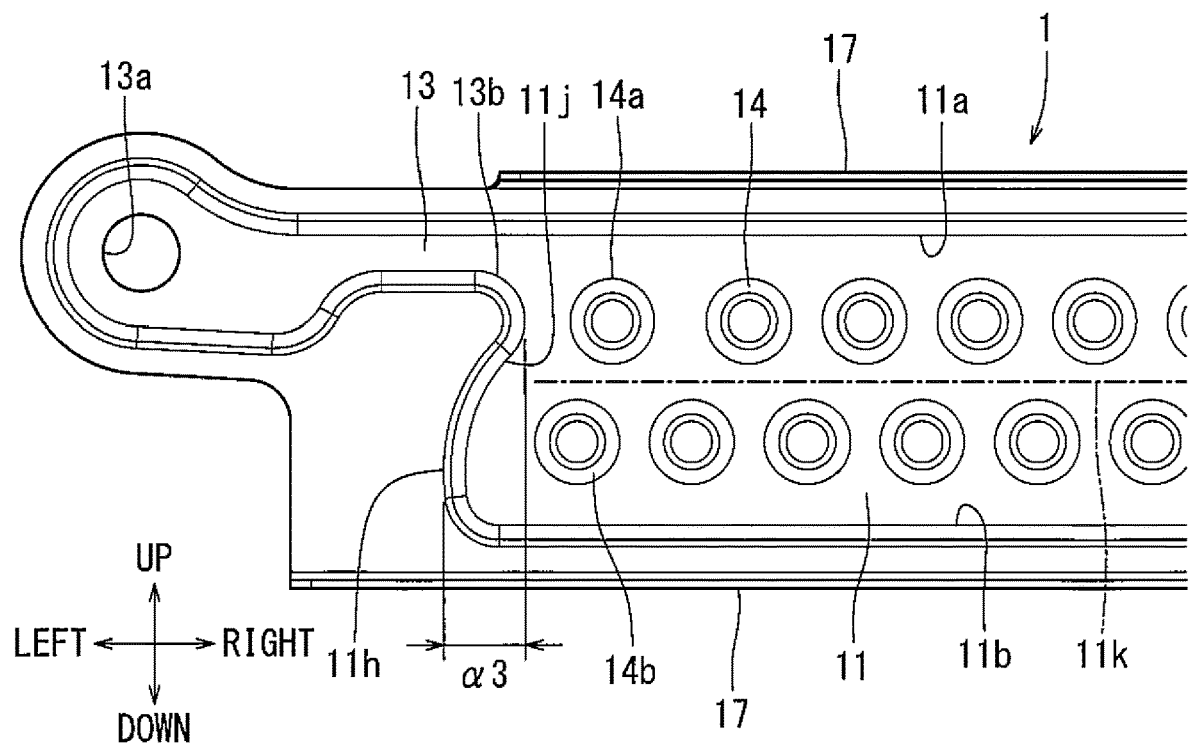
FIG. 11 is a partial front view of a further embodiment of a battery cooler.

FIG. 11 shows another embodiment of a battery cooler 1. In this embodiment, an outflow side wall surface 11*h* having a shape different from that of the outflow side wall surfaces 11*d*, 11*f* of FIG. 4 and FIG. 10 is used. The outflow side wall surface 11*h* rises upward from the bottom surface 11*b* of the refrigerant filling chamber 11 toward the connection part 13*b* of the refrigerant outflow passage 13. The outflow side wall surface 11*h* rises while curving in a shape projecting to the left side. Further, the outflow side wall surface 11*h* is bent in a shape projecting to the right side at the lower part of the connection part 13*b*. This bent shape allows an inclined surface 11*j* to be formed at the lower part of the connection part 13*b*. The inclined surface 11*j* is formed at a boundary part (or a position adjacent to the connection part 13*b*) between the curved shape projecting to the left side and the bent shape projecting to the right side. A lateral surface of the outflow side wall surface 11*h* located inside the refrigerant filling chamber 11 is inclined downward from the horizontal direction. In this way, the inclined surface 11*j* is formed at the outflow side wall surface 11*h*. Thus, even if the unvaporized refrigerant, which is usually at the liquid level 11*k*, flows toward the refrigerant outflow passage 13, the flow is bounced back by the inclined surface 11*j*. This can suppress leakage of the unvaporized refrigerant into the refrigerant outflow passage 13. The outflow side wall surface 11*h* having the inclined surface 11*j* is located in a range of a predetermined width α3. The width α3 can secure both a space for welding the end plate 22 and a cooling surface for the end most unit cell 6, as in the case of FIG. 4.

Other Embodiment

In another embodiment, the battery cooler 1 may be composed of copper, aluminum, or the like, instead of the steel plates.

In another embodiment, the joint part 14 may be square-shaped, rectangular, hexagonal, or the like, instead of being circular.

In order to allow for expansion and/or shrinkage of each unit cell 6, the right and/or left end plate 22 may be slidable with respect to the battery cooler 1 and/or the holding frame 21, instead of being fixed. The unit cells 6 in each row may be bound together with two end plates 22 opposed to each other across the right and left sides with an expandable binding band. The unit cells 6 forming the two rows may be bound together with the battery cooler 1 sandwiched between the rows and the holding frame 21 opposed to each other across the two rows using the same binding band.

Although unit cells 6 arranged in two rows were described and shown in the drawings, other embodiments may have the unit cells 6 arranged in three or more rows. In this case, a plurality of battery coolers 1 can be arranged between the adjacent rows.

Advantageous Effect

In some embodiments, the inclined surfaces 11e, 11g, 11j are directed downward from a horizontal direction. The inclined surfaces 11e, 11g, 11j are provided at the lateral surfaces of the outflow side wall surfaces 11d, 11f, 11h. The outflow side wall surfaces 11d, 11f, 11h rise from the bottom surface 11b of the refrigerant filling chamber 11 toward the connection part 13b of the refrigerant outflow passage 13. The inclined surfaces 11e, 11g, 11j face the inside the refrigerant filling chamber 11. Thus, even if the battery is used in an inclined or vibrating environment, and unvaporized refrigerant flows toward the refrigerant outflow passage 13, the flow is blocked by the inclined surface 11e, 11g, or 11j. This can suppress leakage of the unvaporized refrigerant into the refrigerant outflow passage 13.

In some embodiments, the joint parts 14 are arranged in a staggered manner. Thus, even if the positions of the unit cells 6 in an assembled battery with respect to the refrigerant filling chamber 11 deviate from an initial assumed position, for instance due to the assembly variations, the possibility that the joint parts 14 of the refrigerant filling chamber 11 are arranged unevenly on the abutting surfaces of a part of the unit cells 6 is reduced. This can suppress variations in the abutting area due to the assembly variations. Thus, variations in the cooling capacity of the refrigerant filling chamber 11 with regard to each unit cells 6 is suppressed.

In some embodiments, even if unvaporized refrigerant flows toward the refrigerant outflow passage 13, the flow is blocked by the inclined surfaces 11e, 11g, 11j of the outflow side wall surfaces 11d, 11f, 11h. Similarly, the joint part 14b adjacent the outflow side wall surfaces 11d, 11f, 11h can suppress outflow of the unvaporized refrigerant through the refrigerant outflow passage 13 due to its staggered arrangement with respect to other joint parts 14.

In some embodiments, the inclined surfaces 11e, 11g, 11j are provided at positions adjacent to the connection part 13b. Thus, the effect of suppressing the outflow of unvaporized refrigerant through the refrigerant outflow passage 13 can be enhanced.

In some embodiments, the refrigerant flowing in from the refrigerant inflow passage 12 flows along the bottom surface 11b at the lower part of the refrigerant filling chamber 11. The refrigerant flowing out toward the refrigerant outflow passage 13 flows along the top surface 11a at the upper part of the refrigerant filling chamber 11. The joint parts 14 are arranged in the region AR sandwiched between the refrigerant inflow passage 12 and the refrigerant outflow passage 13. Thus, the inflow resistance against the refrigerant flowing into the refrigerant filling chamber 11 from the refrigerant inflow passage 12 and the outflow resistance against the refrigerant flowing out from the refrigerant filling chamber 11 to the refrigerant outflow passage 13 can be suppressed.

In some embodiments, outflow side wall surfaces 11d, 11f, 11h of the refrigerant filling chamber 11 are formed. Even in this cases, horizontal widths thereof are restricted to a predetermined width α1, α2, or α3, thereby securing a plane where the end plate 22 (a wall body forming the housing) abuts the flat part 15 provided at a lower portion of the refrigerant outflow path 13, and securing a cooling area for unit cell 6 disposed adjacent to the end plate 22.

Although specific embodiments have been described above, the present invention is not limited to these embodiments. It should be understood that various improvements, modifications, additions, and deletions can be made within the scope of the present invention without departing from the spirit of the present invention.

We claim:

1. A battery cooler arranged to be sandwiched between side surfaces of a plurality of unit cells forming an assembled battery, comprising:
   a refrigerant filling chamber in which refrigerant is charged, the refrigerant filling chamber being sandwiched between opposed unit cells of the assembled battery and arranged at a position where the refrigerant filling chamber is configured to receive heat from the opposed unit cells;
   a refrigerant inflow passage configured to allow a refrigerant condensed by an external condenser to flow into the refrigerant filling chamber, the refrigerant inflow passage being connected to a lower portion of the refrigerant filling chamber; and
   a refrigerant outflow passage configured to allow a refrigerant vaporized in the refrigerant filling chamber due at least in part to the heat of the unit cells to flow out and toward the condenser, the refrigerant outflow passage being connected to an upper portion of the refrigerant filling chamber, wherein:
   the refrigerant filling chamber has opposed wall surfaces in contact with the side surfaces of the unit cells arranged at both sides of the refrigerant filling chamber,
   the refrigerant filling chamber has a first joint part joining a portion of the opposed wall surfaces so as to suppress expansion and deformation of the refrigerant filling chamber caused by a pressure of the refrigerant in the refrigerant filling chamber, and
   an outflow side wall surface rising from a bottom surface of the refrigerant filling chamber toward a connection part of the refrigerant outflow passage is provided with an inclined surface directed downward from a horizontal direction.

2. The battery cooler according to claim 1, further comprising:
   a plurality of joint parts, the plurality of joint parts being arranged in a staggered manner along the opposed wall surfaces of the refrigerant filling chamber on which the unit cells abut.

3. The battery cooler according to claim 2, wherein:
   the plurality of joint parts are arranged in the staggered manner by misaligning lower joint parts of the plurality of joint parts with upper joint parts of the plurality of joint parts in a vertical direction.

4. The battery cooler according to claim 3, wherein:
   the connection part is aligned with the upper joint parts of the plurality of joint parts in the horizontal direction, and
   the inclined surface is provided at a position adjacent to the connection part.

5. The battery cooler according to claim 1, wherein:
   the first joint part is arranged within a belt area extending in a direction in which the bottom surface of the refrigerant filling chamber extends, the belt area having a constant width, and
   the refrigerant inflow passage and the refrigerant outflow passage are located at upper and lower outer sides of the belt area in a vertical direction.

6. The battery cooler according to claim 1, wherein:
the refrigerant inflow passage and the refrigerant outflow passage are located at opposite sides of the refrigerant filling chamber and protrude in directions away from each other,
flat parts abutting wall bodies forming a housing for holding the unit cells are integrally provided above the refrigerant inflow passage and below the refrigerant outflow passage, and
the outflow side wall surface is formed within a horizontal width configured to provide an area on which the wall bodies abut and configured to provide a cooling area of the refrigerant filling chamber on which the unit cells arranged adjacent to the wall bodies abut.

7. The battery cooler according to claim 1, wherein the inclined surface of the outflow side wall surface is inclined relative to the bottom surface of the refrigerant filling chamber.

8. The battery cooler according to claim 1, wherein the inclined surface of the outflow side wall surface is directed to face toward the bottom surface of the refrigerant filling chamber.

9. The battery cooler according to claim 1, wherein a reference line projecting normal from the inclined surface of the outflow side wall intersects the bottom surface of the refrigerant filling chamber.

10. The battery cooler according to claim 9, wherein the reference line projecting normal from the inclined surface intersects the first joint part at a point between the inclined surface of the outflow side wall surface and the bottom surface of the refrigerant filling chamber.

11. The battery cooler according to claim 1, wherein the inclined surface of the outflow side wall surface is inclined toward the first joint part.

12. The battery cooler according to claim 1, wherein an acute angle is formed between the inclined surface of the outflow side wall surface and a reference line running parallel to the bottom surface of the refrigerant filling chamber.

13. The battery cooler according to claim 1, wherein:
the first joint part is positioned adjacent the outflow side wall surface,
a second joint part is positioned adjacent the outflow sidewall surface, and
the first and second joint parts adjacent the outflow side wall surface are arranged in a staggered manner such that the first and second joint parts are misaligned in a vertical direction.

14. The battery cooler according to claim 1, further comprising a second joint part, wherein the first joint part and the second joint part are positioned at equal distances from the inclined surface of the outflow side wall surface.

15. The battery cooler according to claim 1, further comprising a second joint part, wherein the second joint part is positioned nearer the refrigerant outflow passage than the first joint part in a direction parallel to the horizontal direction.

16. The battery cooler according to claim 15, wherein the second joint part is positioned nearer the bottom surface of the refrigerant filling chamber than the first joint part in a vertical direction perpendicular to the horizontal direction.

17. The battery cooler according to claim 1, wherein:
the refrigerant outflow passage includes a communication hole configured to allow vaporized refrigerant flow out therefrom, and
a second joint part is positioned at an equal distance from the communication hole as the first joint part.

* * * * *